United States Patent
Harrison et al.

[11] Patent Number: 5,961,626
[45] Date of Patent: Oct. 5, 1999

[54] METHOD AND PROCESSING INTERFACE FOR TRANSFERRING DATA BETWEEN HOST SYSTEMS AND A PACKETIZED PROCESSING SYSTEM

[75] Inventors: David Michael Harrison, Mesa; Alison Ii, Gilbert; Dadario McCutcheon, Mesa, all of Ariz.

[73] Assignee: Motorola, Inc., Schaumburg, Ill.

[21] Appl. No.: 08/949,085

[22] Filed: Oct. 10, 1997

[51] Int. Cl.⁶ .............................. G06F 13/38; H04J 3/16; H04J 3/22; H04J 3/24

[52] U.S. Cl. .......................... 710/129; 710/126; 710/127; 710/1; 710/23; 710/30; 710/36; 711/1; 711/2; 370/466; 370/470; 370/471; 370/472; 370/473; 370/474; 370/475

[58] Field of Search ..................................... 395/843, 821, 395/309, 856, 850; 364/478.14; 370/470, 471, 472, 473, 474, 475, 466; 380/3, 25, 49, 50, 51, 52; 711/1, 2; 710/129, 126, 127–23, 30, 36

[56] References Cited

U.S. PATENT DOCUMENTS

| | | |
|---|---|---|
| 4,539,653 | 9/1985 | Bartlett et al. ........................... 364/900 |
| 4,858,117 | 8/1989 | DiChiara et al. ........................ 364/200 |
| 4,872,159 | 10/1989 | Hemmady et al. ........................ 370/60 |
| 4,970,714 | 11/1990 | Chen et al. .............................. 370/216 |
| 5,166,926 | 11/1992 | Cisneros et al. ........................ 370/392 |
| 5,386,518 | 1/1995 | Reagle et al. ........................... 395/310 |
| 5,421,006 | 5/1995 | Jablon et al. ........................... 395/575 |
| 5,497,373 | 3/1996 | Hulen et al. ............................ 370/259 |
| 5,748,633 | 5/1998 | Lawler et al. .......................... 370/401 |
| 5,761,437 | 6/1998 | Takano et al. .......................... 709/247 |
| 5,774,698 | 6/1998 | Olnowich ................................ 395/500 |
| 5,778,189 | 7/1998 | Kimura et al. ..................... 395/200.66 |

*Primary Examiner*—Ayaz R. Sheikh
*Assistant Examiner*—Frantz Blanchard Jean
*Attorney, Agent, or Firm*—Gregory J. Gorrie

[57] ABSTRACT

Interface processor (IP)(50) sends and receives data units to and from an external host and a processor. The IP is capable of simultaneous, full duplex operation via high speed serial and parallel interfaces. The IP provides a highly flexible and configurable interface which is capable of interfacing to a variety of systems with minimal external hardware. The IP also provides a method of converting received data into data packets. The IP provides buffering of multiple data packets for use in systems having "bursty" data traffic. The IP has a memory expansion capability allowing for changeable buffer capacities.

21 Claims, 5 Drawing Sheets

| DWORD OFFSET | DESCRIPTION |
|---|---|
| 00 | DU HEADER |
| 01 | COMMAND |
| 02-4094 | PARAMETER DATA |
| LAST DWORD | FRAME CHECK SEQUENCE |

|←——32 BITS——→|

*FIG. 3*

| DU HEADER FORMAT | | | | | | |
|---|---|---|---|---|---|---|
| TYPE | PHYSICAL PORT OR DESTINATION | PHY. ID | LOGICAL DESTINATION | PDU LENGTH | MLS TAG | PRIORITY |
| 2 BITS | 3 BITS | 1 BIT | 10 BITS | 12 BITS | 3 BITS | 1 BIT |

*FIG. 4*

| COMMAND FORMAT | | | | |
|---|---|---|---|---|
| BITS (31..22) | 21..15 | 14..12 | 11..01 | 0..0 |
| COMMAND ID | RESPONSE | PHYSICAL SOURCE | LOGICAL SOURCE | RESERVED |

METHOD AND PROCESSING INTERFACE FOR TRANSFERRING DATA BETWEEN HOST SYSTEMS AND A PACKETIZED PROCESSING SYSTEM

CROSS-REFERENCE TO RELATED APPLICATIONS

This application is related to co-pending U.S. patent application Ser. Nos. 08/841,314, filed on Apr. 28, 1997, entitled "PROGRAMMABLE CRYPTO PROCESSING SYSTEM AND METHOD", 08/904,991, filed on Aug. 1, 1997, entitled "CONFIGURABLE CRYPTOGRAPHIC PROCESSING ENGINE AND METHOD", 08/922,056, filed Sep. 2, 1997, entitled "CRYPTOGRAPHIC PROCESSING SYSTEM WITH PROGRAMMABLE FUNCTION UNITS AND METHOD", which are assigned to the same assignee as the present application.

This application is also related to co-pending U.S. patent application Ser. No. 08/949,082 Oct. 10, 1997, entitled "METHOD AND SYSTEM FOR MANAGING DATA UNIT PROCESSING".

FIELD OF THE INVENTION

This invention relates in general to the field of interface processors for processing systems, in particular to interface processors for cryptographic processing systems.

BACKGROUND OF THE INVENTION

Interface processing systems have been used to interconnect and exchange data (packets) between signal and data processing systems. For example, dual port memories having semaphore capability, FIFO buffers having serial and parallel interfaces, and protocols designed to provide a method for exchanging data have been used to exchange information between systems. Existing interface processing systems typically require a substantial quantity of custom logic to implement each data exchange system. Existing interface processing systems typically do not provide any customization for particular implementations. More specifically, existing interface processing systems commonly provide a low level functionality which requires substantial software and hardware to perform data exchange between systems. Additionally, when existing systems provide a low level functionality which requires substantial software and hardware, the implementation results in low performance and redundant hardware thereby increasing cost and power consumption.

Thus, what is needed are a method and system for improved interface processing. What is also needed are a method and system for flexible and configurable interface processing which is capable of interfacing to a variety of systems. Also needed are a method and system which provides high performance data (packet) exchange between systems. What is also needed are a method and system having a serial and parallel interface which are capable of performing high speed data exchanges between systems. Also needed are a method and system providing an interface buffer capable of processing transient, high speed data exchanges. Also needed are a method and system providing high assurance, multi-level secure data exchanges between systems.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides, among other things, a method and system for improved interface processing. The present invention also provides a method and system for flexible and configurable interface processing which is capable of interfacing to a variety of systems. The present invention also provides a method and system which provides high performance data (packet) exchange between systems. The present invention also provides a method and system having serial and parallel interfaces which are capable of performing high speed data exchanges between systems. The present invention also provides a method and system having an interface buffer capable of processing transient, high speed data exchanges between systems. The present invention also provides a method and system providing high assurance, multi-level secure data exchanges between systems.

Figure 1:
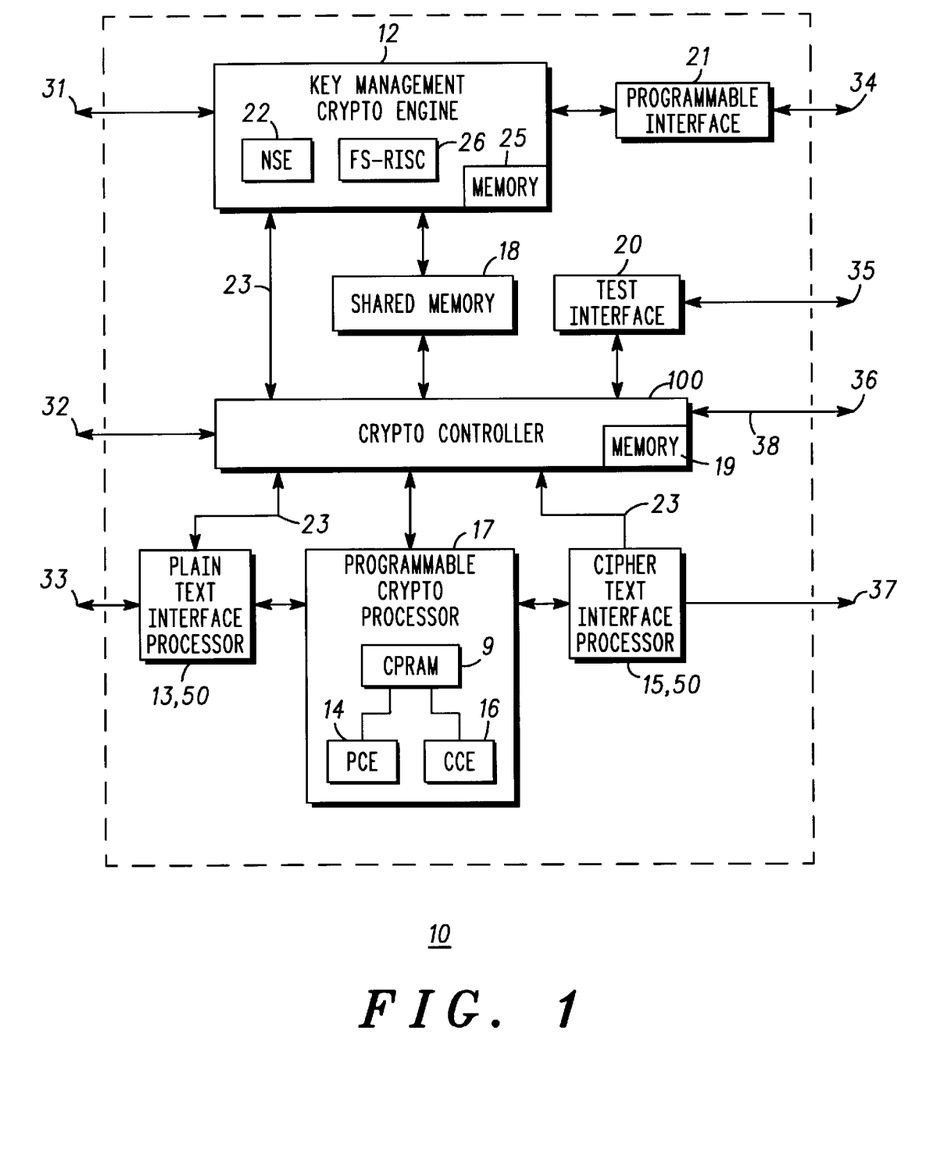
FIG. 1 illustrates a hardware block diagram of a programmable crypto processing system suitable for use with a preferred embodiment of the present invention.

FIG. 1 illustrates a hardware block diagram of a programmable crypto processing system in accordance with a preferred embodiment of the present invention. Crypto processing system 10 has, in the preferred embodiment, two primary processing elements, Key management crypto engine (KMCE) 12 and programmable cryptographic processor (PCP) 17. PCP 17 comprises two processing engines, programmable cryptographic engine (PCE) 14 and configurable cryptographic engine (CCE) 16. The processing engines perform the execution of channel programs. System 10 also includes cryptographic controller (CC) 100 which performs the program management for the processing engines. System 10 also includes plain text interface processor (PTIP) 13 and cipher text interface processor (CTIP) 15 which provide external interfaces and signaling for system 10. The interface processors (IPs) also provide a high performance secure flexible buffer between an external host and the internal processing systems of system 10. System 10 also includes shared memory 18 which serves as an elastic buffer between KMCE 12 and PCP 17. System 10 also includes programmable interface 21 coupled with FILL and CIK ports 34. Testing of system 10 may be performed using test interface 20 which includes on-chip emulation and JTAG ports 35.

KMCE 12 includes internal memories 25 and is coupled to CC 100 by internal bus 23. Other internal busses 23 couple PTIP 13, CTIP 15, PCP 17 and shared memory 18 to CC 100.

In the preferred embodiment KMCE 12 also contains fail-safe reduced instruction set computer (FS-RISC) 26. KMCE 12 preferably includes a second processing resource such as a mod N solution extractor (NSE) 22. FS-RISC 26 is preferably comprised of dual 32 bit RISC cores, which execute an embedded secure operating system (SOS). The secure operating system provides segmentation and task management to allow tasks to be executed from a program memory external to system 10. Such tasks may include tasks and subroutines that do not perform secure processing or handle sensitive data. Tasks and subroutines that perform secure processing or handle sensitive data are preferably executed from an internal program memory (ROM) included in memories 25.

In the preferred embodiment of the present invention, the functions performed by the FS-RISC's SOS from internal ROM include, among other things, master control of system 10, self-test and alarm monitoring of the system 10, program loading and real-time multi-level secure task management. Program loading includes loading of both secure and non-secure programs into either internal memories 25 or the loading of algorithms or programs to PCP 17.

FS-RISC 26 may also run application software from internal program memories (RAM) of memories 25. Typical application software running on FS-RISC 26 from internal program RAM includes functions such as CIK and fill-port processing for low level handling of sensitive data. Examples of this include the loading of keys. Examples of other application software running would include session key generation, by for example, public key programs and other key management and control functions. Application software may also include system management and key management functions such as loading, verifying, changing and auditing.

FS-RISC 26 may also run application software from external program memories. These external program memories may be RAM of an external host system. Such application software running from external program RAM preferably includes functions such as interface protocol processing (e.g., DS-101 and NSA 87-27), key management operations, command processing, non-secure program software and software not directly related to the handling of sensitive data.

PCP 17 is a high performance programmable superscaler cryptographic processing element which among other things, performs functions on data units and processes data units. Data units are loaded into either PTIP 13 or CTIP 15, preferably by an external host. CC 100 initiates processing of a data unit by instantiating (loading) the required context (e.g., state and variable) and program code upon reading data unit header information. Once a data unit is loaded into PCP 17 and the processing is performed and the result is written to the output interface processor (IP). A processed data unit may alternatively be provided to another destination such as KMCE 12 for further processing.

CC 100, among other things, manages the overall data movement among IP 50 and the execution resources of crypto engines 14 and 16, NSE 22 and FS-RISC 26. CC 100 operates generally as a secure real-time operating system by determining the data to move, the tasks to install in PCP 17, and when to initiate the execution of a program. CC 100 accomplishes this by examining the contents of each data unit. This is discussed in detail below. This data driven architecture provides system 10 with high performance processing capabilities. Additionally, CC 100 performs background staging. Next tasks and data units are staged during execution of present tasks. The background staging allows for the high throughput of system 10. For example, data unit transfer to PCP 17, memory cleanup and program loading for the next data unit are performed during processing of a previous data unit.

In a preferred embodiment of the present invention, PCP 17 comprises, among other elements, two high speed processing engines, PCE 14 and CCE 16, which perform functions such as channel encryption and decryption and other data processing typically performed in secure communications and signaling. In the preferred embodiment, PCE 14 performs codebook style programs while CCE 16 performs combiner style programs. PCE 14 and CCE 16 operate independently and in combination provide more than 1200 MIPs of processing power for 32 bit data. In the preferred embodiments of the present invention, PCE 14 and CCE 16 are comprised of high-performance 32-bit RISC processors running at around 100 megahertz in a four stage pipeline configuration. These RISC processors, among other things, may also be used for data processing such as in-band signal processing, error detection and correction, and other protocol and format processing as defined by a channel program.

PCP 17 also includes a crypto processor RAM 9 (CPRAM) for storing channel programs and/or data units. CC 100 downloads a channel program from CPRAM 9 to a memory of a processing engine prior to processing a data unit. CC 100 also downloads channel program context from CPRAM 9 to a memory of a processing engine prior to processing a data unit.

KMCE 12 performs, among other things, the master control functions for system 10. In the preferred embodiment, KMCE 12 contains a secure operating system (SOS) embedded in ROM within KMCE 12. In the preferred embodiment, FS-RISC 26 is a redundant pair of high performance 32 bit RISC processors. In addition to FS-RISC 26, KMCE 12 preferably includes a math coprocessor suitable for public key program processing. In this embodiment, KMCE 12 has around 150 MIPs processing capability to allow the execution of multiple channel and single channel embedded applications.

In other embodiments, system 10 may serve as an embedded cryptographic processing element for a variety of applications. For example, system 10 may allow data flow through architectures or coprocessor architectures to be implemented. In the data flow through architecture, data may flow from plain text interface port 33 to cipher text interface port 37 or vice versa. The internal security mechanisms embodied in system 10 help isolate the logically different data types such as the sensitive plain text data and variables from the protected cipher text data. In the coprocessor architecture implementation, a host system for example, desirably provides greater design assurance for isolating the data types.

In the preferred embodiments of system 10, IP 50 includes 8-bit, 16-bit and 32-bit parallel data interfaces at ports 33 and 37 with FIFO and microprocessor compatible data and control structures. IP 50 also preferably includes serial asynchronous and serial synchronous interfaces. IP 50 includes internal processors, internal physical memory and external memory expansion capability. The memories of the IPs are managed by their respective internal processors. In the preferred embodiment, the IPs are capable of simultaneous, full duplex operation on all host interfaces and provide full data interface isolation for processing plain-text and cipher-text data.

Interface ports 31 are associated with KMCE 12, and preferably includes ports for memory interface, configuration signals, system clock and interrupts. In the preferred embodiment, the memory interface port is comprised of a 33 bit data bus, a 24 bit address bus and a control interface for accessing internal memory or I/O devices. In the preferred embodiment of system 10, KMCE 12 receives commands and data through either PTIP 13 or CTIP 15. Other embodiments allow control and data to come from interface port 31.

System 10 also includes context memory bus 38 (CNTX) which connects to context port 36. In the preferred embodiment, context memory bus 38 is comprised of a 33-bit data bus and an address control bus which are used to couple to an external context memory. CC 100 manages the swapping of context from an active task in PCP 17 to an inactive task in the external context memory. Bus 38 allows for high speed context changes for applications requiring more concurrent tasks than may reside in internal memory. Port 32 provides an interface to CC 100 for control signals and discrete alarms signals.

Context, as used herein, includes information, information associated with specific channel programs and may include state, variable (e.g., keys), and function information associated with channels.

In the preferred embodiments, the cryptographic processing system of the present invention is embodied in an ultra large scale integrated (ULSI) device, preferably on a single silicon die. In the preferred embodiment, several processing subsystems are integrated into the ULSI result in approximately 1350 million instructions per second (MIPs) of processing capability suitable for a wide variety of cryptographic program classes.

Figure 2:
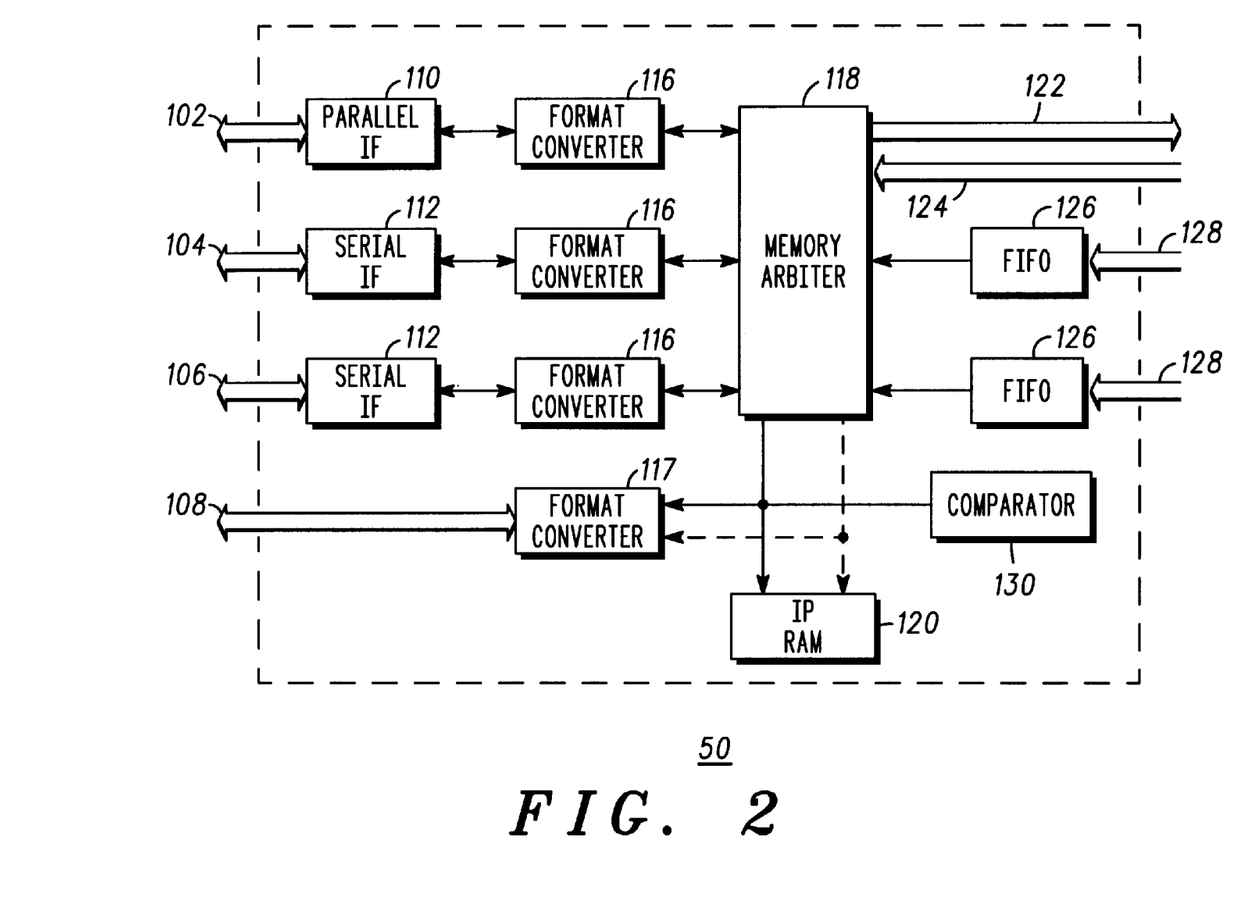
FIG. 2 illustrates a hardware block diagram of an interface processing system in accordance with a preferred embodiment of the present invention.

FIG. 2 illustrates a hardware block diagram of an interface processing system in accordance with a preferred embodiment of the present invention. IP 50 is shown in FIG. 2. IP 50 shown in FIG. 2 represents PTIP 13 and CTIP 15, each shown as an element of system 10 (FIG. 1). Preferably, IP 50 (FIG. 2) is comprised of parallel interface 110, serial interface 112, format converter 116, format converter 117, memory arbiter 118, IP random access memory (RAM) 120, FIFO 126, and comparator 130.

In the preferred embodiment, a format converter 116 is each coupled to parallel interface 110 and serial interface 112 and memory arbiter 118. Format converter 116 is preferably implemented in hardware as a finite state machine (FSM). Format converters 116 are configurable and performs data formatting in three separate modes. The three modes are preformatted data unit (PDU)(described below), fixed length, and variable length formatting modes.

Fixed length format, like variable length format, is a format in which the host data received via parallel interface bus 102, serial interface bus 104, and serial interface bus 106 does not have a header in PDU format. Unlike variable length format, performing fixed length formatting on a data stream transforms the data stream into a series of PDUs of a predetermined fixed length. When a data packet is formatted using fixed length formatting, the predetermined fixed length of the PDU is preferably determined by an element outside IP 50 (described below).

Performing variable length formatting on a data stream transforms a data stream into an PDU which does not have a predetermined length. When a data packet is formatted using variable length formatting, the length is preferably determined by discrete handshaking signals between the interface (e.g., parallel interface 110 and serial interface 112) and an external host.

Like format converter 116, format converter 117 is preferably implemented as a hardware state machine. In the preferred embodiment, format converter 117 is coupled to an external random access memory (RAM) via RAM bus 108, memory arbiter 118, and IPRAM 120. In the preferred embodiment, format converter 117 is configurable to perform 32 bit to 8 bit data conversions which are compatible with 8 bit (byte) wide external RAMs.

In the preferred embodiment, format converters (116, 117) receive configuration information from a source external to IP 50. Preferably, configuration information is received in PDU format from CC 100 (FIG. 1) and is titled a configuration PDU. Configuration PDUs contain operating parameters for the format converters. For example, the payload portion of a configuration PDU contains the PDU header information used by a format converter when performing fixed and variable length data formatting. In the preferred embodiment, each IP contains three format converters 116, one format converter 117, one parallel interface 110, and two serial interface 112 elements. However, IP configurations having other numbers of elements and configurations of elements are possible.

Although FIG. 2 illustrates only three format converters 116 associated with three interfaces, IP 50 may be implemented with many format converters and many interfaces.

Parallel interface (PI) 110 couples to an external host via parallel interface bus 102 and format converter 116. In the preferred embodiment, PI 110 is configurable to accept 8, 16, and 32 bit parallel interface connections via parallel interface bus 102. When configured, PI 110 provides handshaking signals necessary for communicating with an external host via parallel interface bus 102. Preferably, PI 110 is configured by a configuration PDU sent from CC 100 (FIG. 1). PI 110 includes hardware logic which transforms 8 and 16 bit inputs into 32 bit format in accordance with an PDU.

Serial interface (SI) 112 couples to an external host via serial interface buses 104 and 106 and format converter 116. In the preferred embodiment, SI 112 is configurable to accept synchronous and asynchronous serial interface connections via the serial interface buses. When configured, SI 112 provides handshaking signals necessary for communicating with an external host via serial interface bus 104 or 106. Preferably, SI 112 is configured by a configuration PDU sent from CC 100 (FIG. 1). SI 112 includes hardware logic which transforms serial input into 32 bit format in accordance with an PDU.

Memory arbiter (MA) 118 couples to format converters 116 and 117, IPRAM 120, FIFO 126, and comparator 130. In the preferred embodiment, MA 118 is configured by a configuration PDU sent from CC 100 (FIG. 1). Preferably, MA 118 is implemented in hardware and includes a controller for, among other things, arbitrating IPRAM access from format converters 116 and 117, FIFO 126, and custom processor interface buses 122 and 124. MA 118 also includes redundant address pointer tables for storing address pointers to IPRAM. A pointer table stores address pointers of memory addresses where PDUs are stored in IPRAM. The PDUs stored in IPRAM are sent and received from the associated input and output elements (e.g., format converters, FIFOs and custom processor interface buses).

IPRAM 120 couples to format converter 117, MA 118, and comparator 130. In the preferred embodiment, IPRAM 120 is a high speed RAM.

FIFO 126 couples to MA 118 and custom processor interface 128. In the preferred embodiment, FIFO 126 performs as an first-in first-out elastic buffer which receives PDU formatted data from PCE 14 and CCE 16 (FIG. 1).

Comparator 130 couples to MA 118. In the preferred embodiment, comparator 130 performs a monitor function which verifies the addresses provided by MA 118 on the redundant address lines (provided by redundant MA finite state machines) between MA 118 and IPRAM 120. When comparator 130 detects different addresses on the redundant address lines, comparator 130 raises an alarm to CC 100 (FIG. 1) and therefore provides fail-safe operation for data separation. Comparator 130 is preferably implemented in high speed logic.

Figure 3:
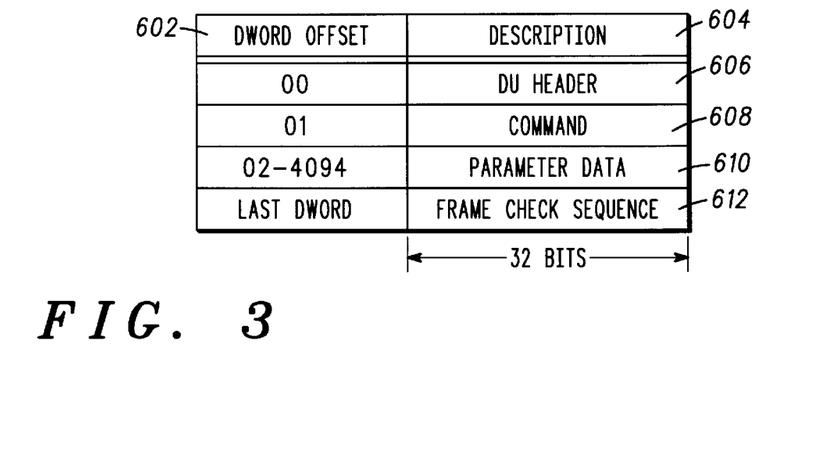
FIG. 3 illustrates a data unit format suitable for use with the preferred embodiment of the present invention.

FIG. 3 illustrates a data unit format suitable for use with the preferred embodiment of the present invention. A preformatted data unit is illustrated in FIG. 3. A preformatted data unit is comprised of a series of words. Each word has an offset shown in column 602. The first word is data unit header dword 606 which is preferably a 32 bit word. Data unit header dword 606 is followed by command dword 608, having a dword offset of one. Following command dword 608 is parameter data field 610 having dword offsets between 2 and 4094. Parameter data field 610 of an PDU contains the application payload. The data in field 610 may have a different format for each channel since the channel may be "context swapped" for each data unit which is processed. For example, when multiple programs are executing in system 10 (FIG. 1) for multiple channels, some channels may use more robust protocols, different packet sizes, different cryptographic algorithms, etc., for each communication thread.

The final dword is frame check sequence dword 612, which is preferably a 32-bit frame check sequence (FCS) which is calculated over an entire PDU. FCS dword 612 is an optional field that may be enabled or disabled for a specific application. During the startup procedure, KMCE 12 (FIG. 1) configures CC 100 (FIG. 1) and determines whether or not check sums are appended to each PDU.

One suitable FCS program is a 32-bit version of the ISO 3309-1964 E specification. This specification defines high level data link control procedures and frame structure for information processing systems and data communications.

Figure 4:
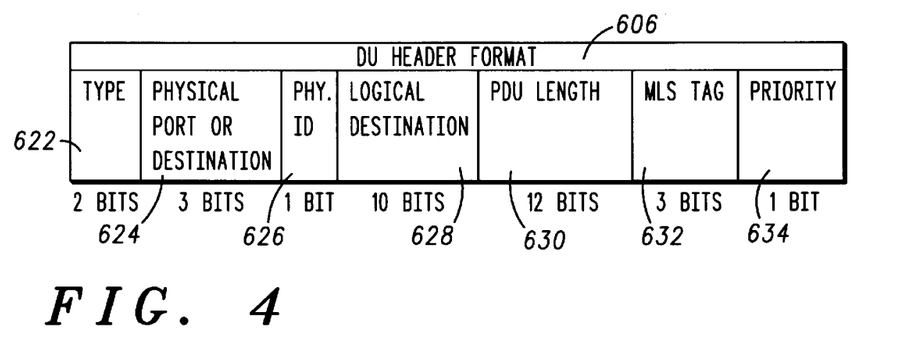
FIG. 4 illustrates a data unit header format suitable for use with the preferred embodiment of the present invention.

FIG. 4 illustrates a data unit header format suitable for use with the preferred embodiment of the present invention. The data unit header format defines the size and location of the fields in channel header dword 606. Channel header dword 606 includes PDU type field 622 of 2 bits, physical port or destination 624 of 3 bits, physical id 626 of 1 bit, logical destination 628 of 10 bits, PDU length field 630 of 12 bits, MLS tag field 632 of 3 bits, and priority bit 634. In the preferred embodiment, priority bit field 634 is optional.

In the preferred embodiment, PDU type field 622 defines a value for the data unit type and its corresponding significance. Preferably, PDU type field 622 determines either the source or destination of the PDU. When the type is "external" and the data comprising the PDU is received from an external host, the PDU is routed to a memory for crypto engine processing. When the type is "external" and the PDU is received from a custom processor (e.g., crypto engine), the data comprising the PDU is routed to an external host.

PDU type field 622 may also determine whether the PDU is a "request" or "response" type PDU. CC 100 uses PDU type field 622 to, among other things, determine the use of physical port or destination 624.

Physical port or destination 624 defines the physical port or destination for each type of PDU. Physical port or destination 624 is re-mapped for each type of PDU. When the type of PDU is a "response", physical port or destination 624 contains a 3-bit request program number (RPN) given in the command dword of the requesting PDU. When the PDU type is "external", the value of this field represents the physical port which received the packet, or the physical port which is to transmit this packet. Physical id 626 and logical destination 628 further define where the packet is processed when received from the external host. An external host processor may request processing by creating a channel in PCE 14, CCE 16, or an application program running in KMCE 12.

When the type of PDU is "internal" or "request", physical port or destination 624 represents the destination of the physical subsystem which processes the packet. The next two fields, the physical id 626 and logical destination 628, further define where the packet is to be processed when the destination is PCE 14, CCE 16, or KMCE 12. The logical destination 628 may define the destination process as the channel number for PCE 14 or CCE 16 or the application task for KMCE 12.

When the type of PDU is "response", logical destination 628 identifies which process, controlled by the CC 100, receives the response PDU. The sender of the PDU determines the value used in this field by receiving the request PDU. The request PDU contains a requesting process number (RPN) in physical source 696 in the command dword (described below).

Physical id 626 qualifies logical destination 628 by determining the logical destination of the data unit (e.g., PCE 14, CCE 16, and KMCE 12). Programs running in the PCE or CCE are channel programs identified by channel number. An application label identifying a process (e.g., cell and strand) identifies programs running in KMCE 12. Preferably, CC 100 uses physical id 626, to route the PDU during processing.

Logical destination 628 represents a channel number or an application label as identified by physical id 626. The 10-bit binary value for logical destination 628 allows 1024 channels or 1024 application labels.

When the logical destination is a channel number, the channel program is identified by a number. Preferably, the channel number is in the range of 0 to 1023. CC 100 uses the channel number to activate the channel program and context associated with the channel number in PCE 14 or CCE 16. The channel has previously been established as part of the activation process for the application. The initialization process which sets up a channel program in KMCE 12 establishes the association of the channel number, channel program, processing engine (e.g., PCE 14 or CCE 16), and the associated context as described above.

When the logical destination is an application label, the data unit is processed by KMCE 12. CC 100 will route the data unit to KMCE 12 via shared memory 18. Data units are routed only when they meet the criteria established for the specific application. For example, if a data unit identifies a channel number for a process that does not exist, CC 100 discards the data unit.

PDU length field 630 represents a number between 0 and 4093 which indicates the number of dwords, including the FCS, which follow command dword 608. PDU length field 630 for DU header 606 defines the size of the data unit which follows. Preferably, the maximum application data unit size is 4094 dwords (131,008 bits). Preferably, PDU length field 630 is used by the IP when receiving (storing) and sending (reading) PDUS.

MLS tag field 632 specifies the security level of the PDU. Preferably, MLS tag field 632 is unused by the IP.

Priority bit field 634 defines a priority level for the PDU. The priority bit is preferably used by IP 50 to select the order of data unit processing. In the preferred embodiment, there are two levels of priority. A zero, for example, may be used to specify non-real-time processing while a one may be used for specifying real-time processing.

Figure 5:
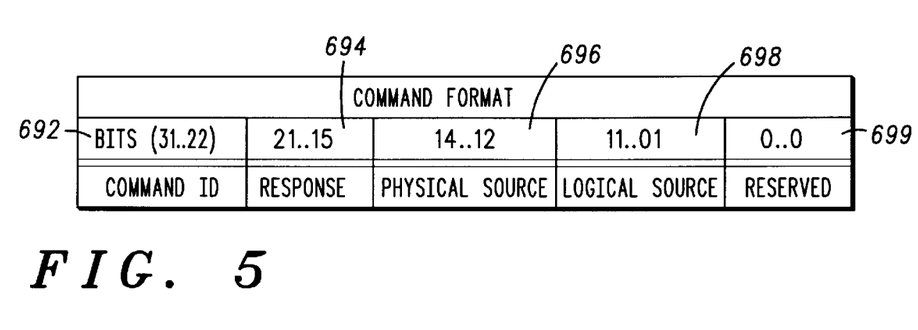
FIG. 5 illustrates a command dword format suitable for use with a preferred embodiment of the present invention.

FIG. 5 illustrates a command dword format suitable for use with a preferred embodiment of the present invention. Command dword 608 is preferably the second dword in each PDU. Command dword 608 includes command id field 692 of 10 bits, response field 694 of 7 bits, physical source field 696 of 3 bits, logical source field 698 of 11 bits, and reserved bit 699. In the preferred embodiment command id field 692 specifies the function to be executed on a data unit. Functions are preferably defined for each channel program- In the preferred embodiment, there are no functions native to system 10. Functions may include for example, encrypt, decrypt, sign, authenticate, etc. A function such as encrypt for example, specifies to the application software that the data portion of the PDU, (e.g., parameter data field 610), should be encrypted. The encryption is performed using a channel program and key specified for that channel selected by physical id 626 and logical destination 628.

Response field 694 returns a processing status with the processed data unit. The response is generated by the processing unit of system 10. For example, PCE 14 may provide a 'processing complete' response to response field 694 at the conclusion of sending the data unit to the output IP. Likewise, CC 100 may send a 'default' response value to the sending processor when the data unit transfer fails. Response field 694 may be dependent on the specific application or channel program.

Physical source field 696 is used in "external" type PDUs to identify which port (e.g., host ports 102, 104, and 106 or custom processor ports 124, 128) received the PDU.

Logical source field 698 identifies the channel program which is sending the PDU. Logical source field 698 may be the channel number of the channel program which is executing in processing engine (e.g., PCE 14 or CCE 16) or the application label which is assigned to a cell and strand combination which is executing within KMCE 12.

In the preferred embodiment, reserved bit 699 is reserved for internal processing within CC 100.

Figure 6:
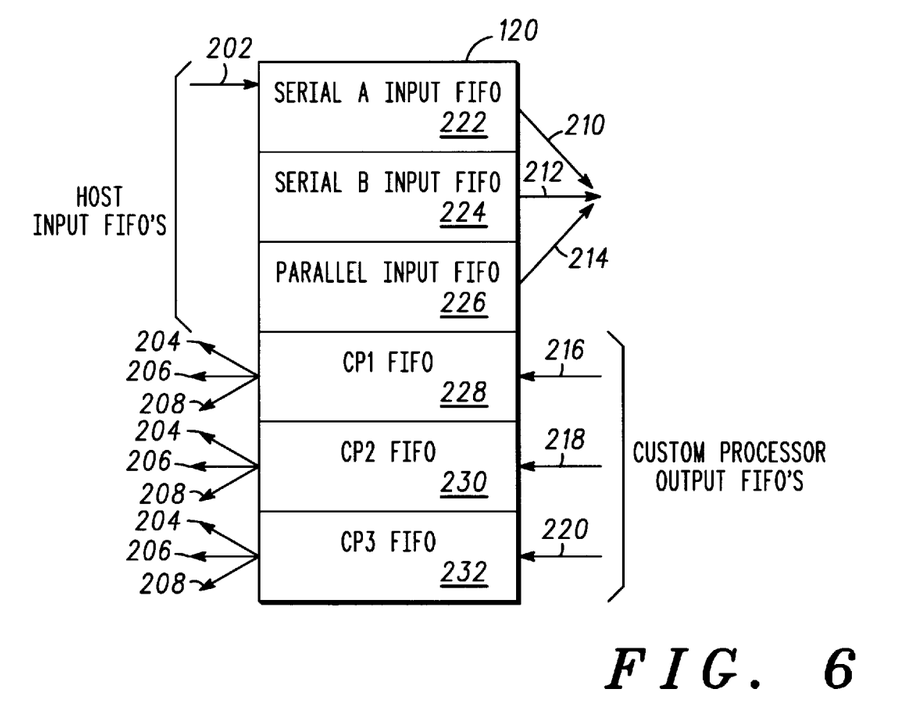
FIG. 6 illustrates a memory buffers diagram of a first-in first-out (FIFO) buffer system in accordance with a preferred embodiment of the present invention.

FIG. 6 illustrates a memory buffers diagram of a FIFO buffer system in accordance with a preferred embodiment of the present invention. In the preferred embodiment, IPRAM 120 is partitioned as a set of circular FIFO buffers, one for each interface. IPRAM 120 is comprised of six logically separate FIFOs, one for each input to IP 50 (preferably, the input coupled to format converter 117 does not have a buffer in IPRAM). Preferably, the inputs into IP 50 are comprised of indirect inputs from three format converter 116 elements, custom processor interfaces bus 122 and 124, and two FIFO 126 elements.

First serial buffer 222, second serial buffer 224, and parallel buffer 226 accept input indirectly from format converter 116 via input 202. Output from first serial buffer 222, second serial buffer 224, and parallel buffer 226 may each be output to CC 100 (FIG. 1) via custom processor interface bus 122.

IPRAM 120 first custom processor buffer 228, second custom processor buffer 230, and third custom processor buffer 232 accept input indirectly from custom processor interface bus 124 and FIFO 126. Output from first custom processor buffer 228, second custom processor buffer 230, and third custom processor buffer 232 may each be output to the three format converter 116 elements.

IPRAM 120 buffers are configurable. In the preferred embodiment, the number of buffers and size of each buffer is configurable by MA 118. Preferably, MA 118 receives buffer configuration information via a configuration PDU sent from CC 100 (FIG. 1). Additional external RAM may be configured to add buffer memory to IPRAM 120 via external RAM interface bus 108.

Figure 7:
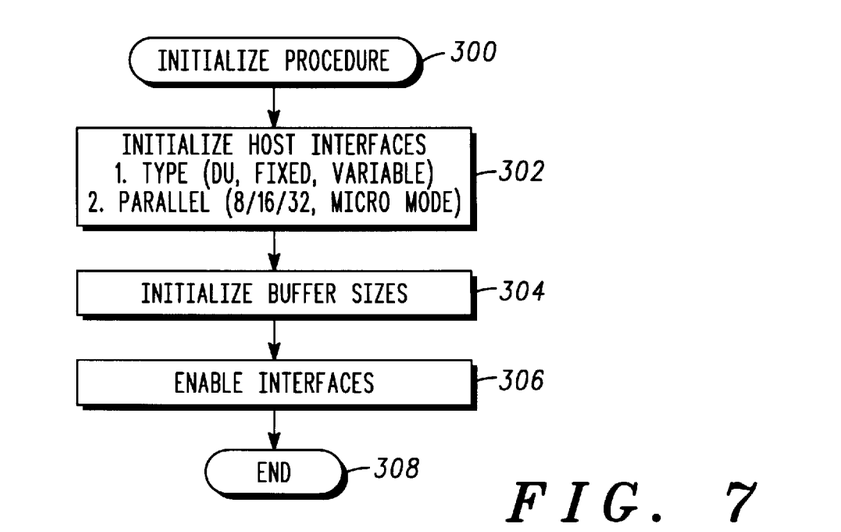
FIG. 7 is a flow chart of a initialization procedure in accordance with a preferred embodiment of the present invention.

FIG. 7 is a flow chart of a initialization procedure in accordance with a preferred embodiment of the present invention. Initialization procedure 300 (FIG. 7) is a procedure which initializes an IP to, among other things, perform format processing for data packets. In the preferred embodiment, procedure 300 is performed by a combination of the serial and parallel interfaces (e.g., serial interface 112 and parallel interface 110 (FIG. 2)), format converters (e.g., format converter 116 and 117 (FIG. 2)) and memory arbiter (e.g., memory arbiter 118 (FIG. 2)).

In task 302, the host interfaces are initialized. In the preferred embodiment, the format converters and parallel and serial interfaces are configured. Preferably, CC 100 (FIG. 1) sends a configuration PDU to the format converters and parallel and serial interfaces. The payload portion of the configuration PDU contains configuration information to, among other things, define the host protocol presented to each parallel and serial interface element and to configure the formatting mode (e.g., PDU, fixed, or variable) for each format converter. Additionally, the number of parallel data bits to be received or transmitted by the parallel interface is defined (e.g., 8, 16, 32 bit, or microprocessor mode (custom definition)). The payload portion of the configuration PDU also contains the PDU header for data which is received in a format other than PDU format. Preferably, data which is received in a format other than PDU format is received from an external processor via the parallel or serial interface elements.

In task 304, the circular buffer sizes are initialized. In the preferred embodiment, the IPRAM memory (circular FIFO buffers) controlled by the MA is allocated. In the preferred embodiment, the MA receives a configuration PDU describing the IPRAM memory map to be maintained when performing data packet storage and retrieval. Among other things, the configuration information in the configuration PDU defines the start and stop address for each circular FIFO buffer within IPRAM. Preferably, memory is allocated to format converters 116, FIFOs 126 and interface 122 and 124.

In task 306, the interfaces are enabled. In the preferred embodiment, the parallel and serial interfaces (e.g., serial interface 112 and parallel interface 110 (FIG. 2)) are enabled by a control signal from CC 100 (FIG. 1).

Figure 8:
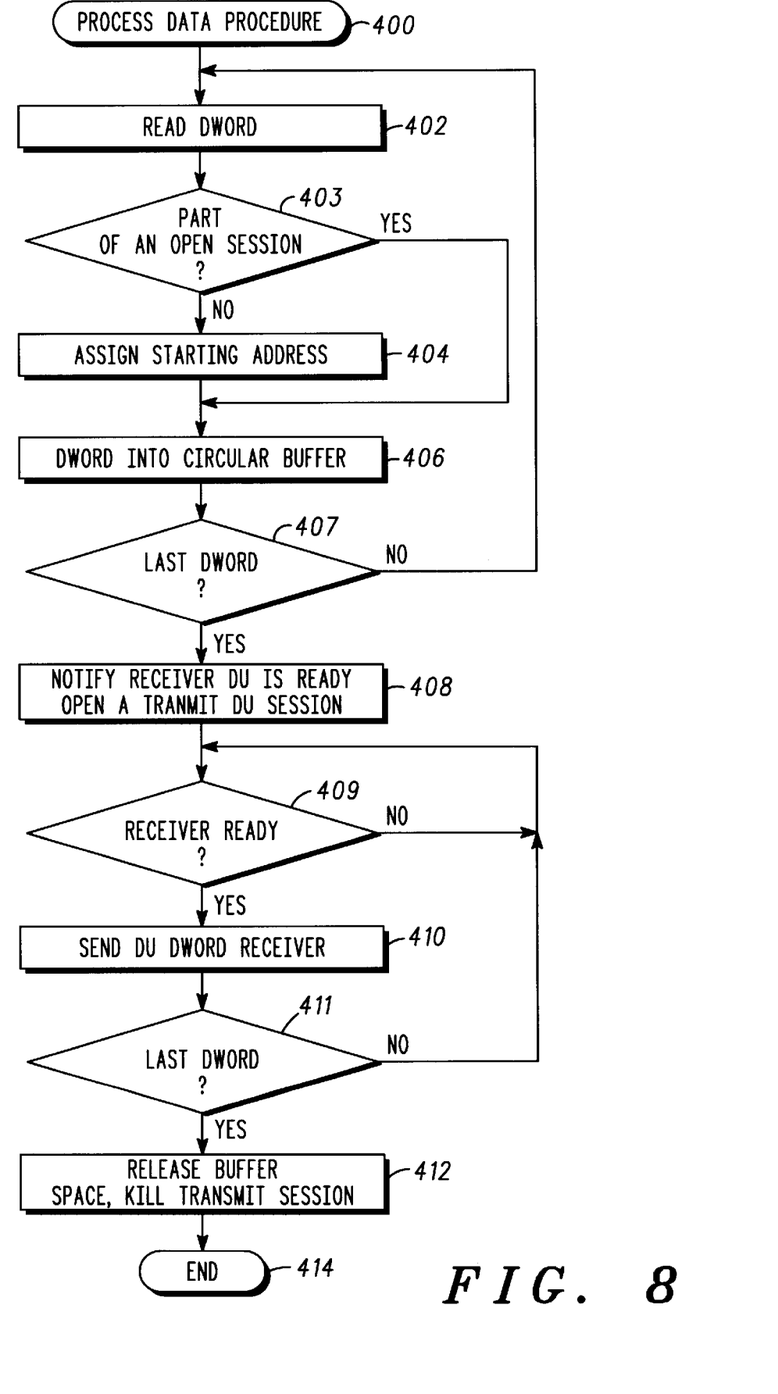
FIG. 8 is a flow chart of a data processing procedure in accordance with a preferred embodiment of the present invention.

FIG. 8 is a flow chart of a data processing procedure in accordance with a preferred embodiment of the present invention. Process data procedure 400 (FIG. 8) is a procedure which IP 50 may use to process data packets. When performing procedure 400, data packets are loaded into and unloaded from a memory (e.g., IPRAM 120 (FIG. 2)). Preferably, procedure 400 is performed by a combination of the memory arbiter (e.g., memory arbiter 118 (FIG. 2)) and format converters (e.g., format converters 116 and 117 (FIG. 2)). In the preferred embodiment of the present invention, procedure 400 is continuously performed by IP 50. Additionally, portions of procedure 400 may be performed concurrently with other portions of procedure. For example, tasks 402–408 are preferably concurrently performed with tasks 409–412.

In task 402, a data word is read into IPRAM. When receiving data from the parallel and serial interfaces, a format converter reads a dword from the associated interface (e.g., parallel or serial) into IPRAM. When receiving data from a custom processor, a dword is read from the associated interface (e.g., custom processor interface bus or FIFO) into IPRAM. In the preferred embodiment, the MA provides arbitration for IPRAM between the parallel, serial, interface bus, and FIFO elements.

In task 403, a check for an open session is performed. In the preferred embodiment, a check for open session is when the MA determines when the start of a new sequence of data is being received. When the MA determines the dword read in task 402 is the first dword read for a PDU, task 404 is performed. When the MA determines the dword read in task 402 is not the first dword read for a PDU, task 406 is performed.

In task 404, the MA assigns a starting address in IPRAM to store the PDU. In the preferred embodiment, the starting address is stored in redundant PDU address pointer tables in the IPRAM.

In task 406, the dword read in task 402 is stored into the circular FIFO (IPRAM) which is allocated in task 404. Preferably, task 406 is performed by the MA.

In task 407, a check for the last dword is performed. In the preferred embodiment, when the MA determines the dword read in task 402 is the last dword of the PDU, task 408 is performed. Otherwise, task 402 is performed. In the preferred embodiment, the MA determines the last dword by reading the PDU header to determine the number of dwords (e.g., PDU length field 630 (FIG. 4)) to be processed.

In task 408, the MA notifies the receiver the data unit is ready and opens a transmit session. In the preferred embodiment, when the receiver of the PDU is the CC, the MA notifies the CC via the custom processor interface bus. When the receiver of the PDU is an external host, the MA notifies the associated format converter. Preferably, the MA starts an internal state machine (transmit session) which monitors the transfer of the data unit to the receiver.

In task 409, a check is performed to determine when the receiver is ready to receive the PDU. When the receiver is the CC, the MA checks a control signal from the CC. When the receiver is an external host, the MA checks a control signal from the associated format converter. When the receiver is ready to receive a dword, task 410 is performed. Otherwise, task 409 is performed.

In task 410, the MA sends a dword of the PDU to the associated receiver. In the preferred embodiment, when the receiver of the PDU is the CC, the MA sends the dword via the custom processor interface bus. When the receiver of the PDU is an external host, the MA notifies the associated format converter. Preferably, the transmit session started in task 408 controls the transfer of the data unit to the receiver.

In task 411, a check for the last dword is performed. In the preferred embodiment, when the MA determines all dwords associated with an PDU have been sent to the associated receiver, task 412 is performed. Otherwise, task 409 is performed. Preferably, MA determines the number of dwords to send by checking the size of the data unit stored in the header of the data unit.

In task 412, the circular buffer is released and the transmit session is killed. In the preferred embodiment, the MA marks the portion of the circular FIFO buffer in IPRAM associated with the transmitted PDU as "available". Additionally, the MA resets the state machine associated with the transmit session in task 408.

Thus, what has been shown are a method and system for improved interface processing. What has also been shown are a method and system for flexible and configurable interface processing which is capable of interfacing to a variety of systems. What has also been shown are a method and system which provides high performance data (packet) exchange between systems. What has also been shown are a method and system having a serial and parallel interface which are capable of performing high speed data exchanges between systems. What has also been shown are a method and system having an interface buffer capable of processing transient, high speed data exchanges between systems. What has also been shown are a method and system providing high assurance, multi-level secure data exchanges between systems.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a processing system embodied within a single integrated circuit substrate, a method of converting unformatted data received from an external source to data units of a predetermined format for subsequent processing by one of a plurality of internal processing elements of the processing system, the processing system including an internal controller and a programmable interface processing element that includes at least one parallel interface and at least one serial interface, a format converter associated with each interface, a random access memory (RAM), and a memory arbitrator, wherein each data unit is comprised of a plurality of data words of a predetermined length, each data unit including a header data word, a command data word and a plurality of parameter data words, the method comprising the steps of:

receiving configuration data from the internal controller for configuring one of the interfaces, the configuration data containing information for the header and command data words of associated data units, the configuration data identifying an amount of memory space to be allocated to the one interface in the RAM;

programming the format converter associated with the one interface with said configuration data;

receiving the unformatted data from the external source through a first one of the interfaces;

creating the plurality of parameter data words by transferring said unformatted data to said RAM in data words, each parameter data word having said predetermined length; and creating a header data word and transferring the header data word to said RAM, said header data word identifying a number of said data words comprising the associated data unit, the header data word identifying one of the plurality of internal processing elements of the processing system for processing the associated data word and a channel program to be used by the identified internal processing element for processing the data unit;

creating a command data word associated with the data unit, the command data word at least identifying a function to be executed by the channel program; and when the data unit is complete, transferring each data word of the data unit to the identified internal processing element.

2. A method as claimed in claim 1 wherein the configuration data comprises a configuration data unit comprised of a plurality of data words of the predetermined length, and wherein parameter data words of the configuration data unit comprise information for the header and command data words of the data units to be created by the one interface.

3. A method as claimed in claim 2 wherein the transferring each data word of said data unit step is performed by the memory arbitrator, and wherein the method further comprises the steps of:

notifying the internal controller when the data unit is completed; and wherein the transferring each data word of the data unit step comprises the step of transferring each data word of said data unit to a second memory location, the transferring step being performed in response to notification by the internal controller that the identified internal processing element is ready to receive the data unit, the second memory location being associated with the identified internal processing element.

4. A method as claimed in claim 3 wherein the transferring said data unit step is performed by said memory arbitrator, wherein said RAM includes first and redundant pointer tables for identifying respectively, a first and a redundant address for said data unit, and wherein the transferring said data unit step includes the steps of:

comparing the redundant address with the first address; and notifying said system controller when there are differences between the redundant address and the first address.

5. A method as claimed in claim 2 wherein the programming step, when said configuration data programs said one interface for formatting fixed length data, the configuration data further includes a length for said fixed length data, said length defining a number of parameter data words to include in said data unit.

6. A method as claimed in claim 5 further comprising the step of adding a frame check sequence data word (FCS) to said data unit after the completion of the transferring step, said FCS being a last data word of said data unit, said FCS being based on said header data word, the command data word and said plurality of parameter data words comprising said data unit.

7. A method as claimed in claim 2 wherein when said configuration data programs one of the interfaces of said interface processing element for receiving variable length data, the configuration data is devoid of length information, and the receiving the unformatted data step includes the steps of:

receiving said variable length data; and receiving notification from said external host system when the data transmission is complete, and wherein the creating a header data word step includes the step of determining a number of data words that comprise said associated data unit and including said number in said header data word.

8. A method as claimed in claim 2 wherein the programming step, said configuration data programs one of the interfaces of said interface processing element for receiving pre-formatted data units that include an included header data word, and wherein the writing a header step includes the step of writing said included header data word to a portion of said RAM associated with said first interface.

9. A method as claimed in claim 2 wherein said interface processing element further includes an expansion memory format converter for coupling to an external expansion memory, the expansion memory being external to the integrated circuit substrate, and wherein the receiving configuration data step includes the step of receiving said configuration data, said configuration data further including information to program said expansion memory format converter, said configuration data defining a number of storage locations of said external expansion memory and a number of bits of the storage locations, and wherein the method further includes the steps of:

the expansion memory format converter converting said data words of said predetermined length to a differing length for said number storage locations of said external expansion memory, the differing length corresponding with the number of bits of the storage locations of the external expansion memory; and transferring said converted data words of differing length to said external expansion memory.

10. A programmable interface processing element embodied within a single integrated circuit substrate, the substrate embodying a processing system that comprises the programmable interface processing system, a plurality of internal processing elements and an internal controller, the programmable interface processing element comprising:

a plurality of interfaces for receiving unformatted data from a source external to the integrated circuit die a format converter associated with each interface, at least one format converter being programmed in accordance with configuration data from the internal controller for receipt of the unformatted data, and converting the unformatted data to data units of a predetermined format, each data unit comprised of a plurality of data words of a predetermined length including a header data word, command data word and a plurality of parameter data words;

a random access memory (RAM) for storing data words and having portions allocated to the one interface in accordance with said configuration data; and a memory arbitrator for transferring data words from the format converter to said RAM, and transferring completed data units from the RAM to an identified one of the internal processing elements, wherein the format converter creates the plurality of parameter data words by converting the unformatted data into data words of the predetermined length, creates the header data word and command data word from the configuration data and causes the memory arbitrator to transfer the parameter data words, header data word and command data word to the RAM to create a data unit, the header word identifying the one internal processing elements and a channel program for use by the identified internal processing element for processing the data unit, the command data word identifying a function to be executed by the channel program.

11. A system as claimed in claim 10 wherein the configuration data comprises a configuration data unit comprised of a plurality of data words of the predetermined length, and wherein parameter data words of the configuration data unit comprise information for the header and command data words of the data units to be created by the format converter associated with the one interface.

12. A system as claimed in claim 11 wherein the memory arbitrator includes logic circuitry for notifying the internal controller when the transferring of each of said data words of said data unit to RAM is completed and for transferring said completed data unit to a second memory location associated with the one internal processing element when requested by the internal controller.

13. A system as claimed in claim 11 wherein the memory arbitrator includes a comparator and wherein said RAM includes first and redundant pointer tables for identifying respectively, a first and a redundant address for said data unit, and wherein the comparator includes means for comparing the redundant address with the first address, and notifying the internal controller when there are differences between the redundant address and the first address.

14. A system as claimed in claim 11 wherein said configuration data programs the one interface for formatting fixed length data, the configuration data further includes a length for said fixed length data, said length defining a number of parameter data words to include in the data unit.

15. A system as claimed in claim 14 wherein the format converter includes means for adding a frame check sequence data word (FCS) to said data unit, said FCS becoming part of said data unit, said FCS being based on said header data word, the command data word and said parameter data words of said data unit.

16. A system as claimed in claim 11 wherein when said configuration data programs said one interfaces for receiving variable length data, the configuration data being devoid of length information, and the one interface includes means for receiving said variable length data from the external source, and receiving notification from said external source when the data transmission is complete, and wherein the memory arbitrator has means for determining a number of data words that comprise said the data unit created from the variable length data and including the length information in said header data word of the data unit.

17. A system as claimed in claim 11 wherein the configuration data programs one of the interfaces for receiving pre-formatted data units that include an included header data word, and wherein the memory arbitrator has means for writing said included header to a portion of said RAM associated with said first interface.

18. A system as claimed in claim 11 further comprising an expansion memory format converter for coupling to an external expansion memory external to said integrated circuit substrate, and said configuration data further include information to program said expansion memory format converter, said configuration data defining a number of storage locations of said external expansion memory, and wherein the expansion memory format converter has means for converting said data words of said predetermined length to a differing length corresponding with a number of bits of each storage location of the external expansion memory said number of storage locations of said external expansion memory, and wherein the memory arbitrator includes means for transferring said converted data words of the differing length to said external expansion memory.

19. A system as claimed in claim 10 wherein the memory arbitrator is coupled between the plurality of format converters and the RAM.

20. A system as claimed in claim 10 wherein each data word comprises a 32-bit word.

21. A integrated processing system on a substrate comprising: a plurality of internal processing elements;

an interface processing element; and a controller configured coupled to the interface processing element and the internal processing elements, the controller configured to provide configuration data to the interface processing element, the configuration data identifying one of the internal processing elements, a channel program, and a function for subsequent processing of data units, wherein the interface processing element comprises:

a format converter for creating data units of a predetermined format, each data unit comprising parameter data words created from unformatted data received from an external source, and a header word and a control data word created from the configuration data;

a memory for storing the data words created by the format converter; and a memory arbitrator for transferring data words from the format converter to the memory and notifying the controller when the data unit is completed, each data unit comprising the header and command data word and a plurality of parameter data words.

* * * * *